Oct. 30, 1923.
O. LA WHITE ET AL
1,472,419
FIBER DRESSING APPARATUS
Filed Aug. 9, 1921
9 Sheets-Sheet 4
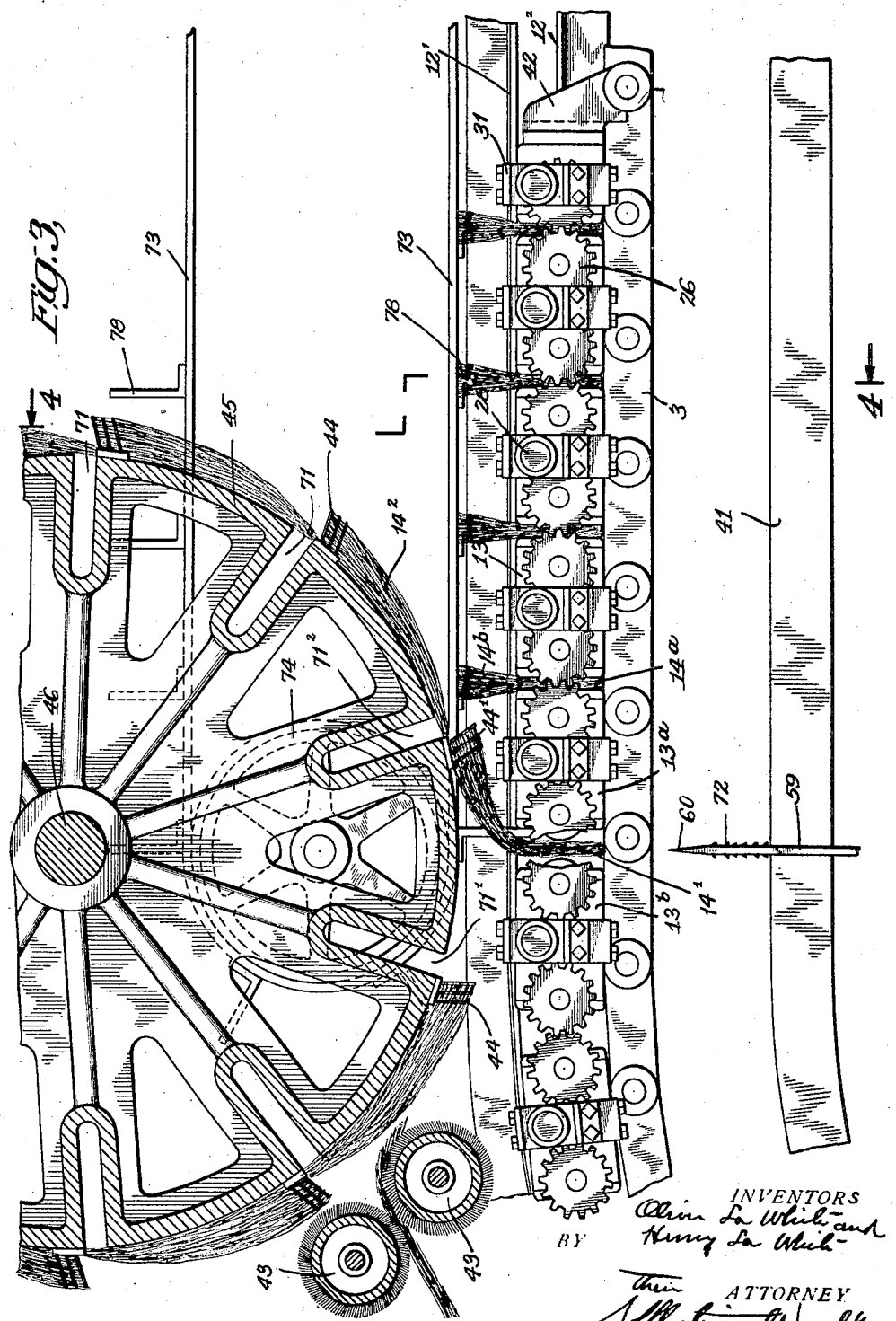

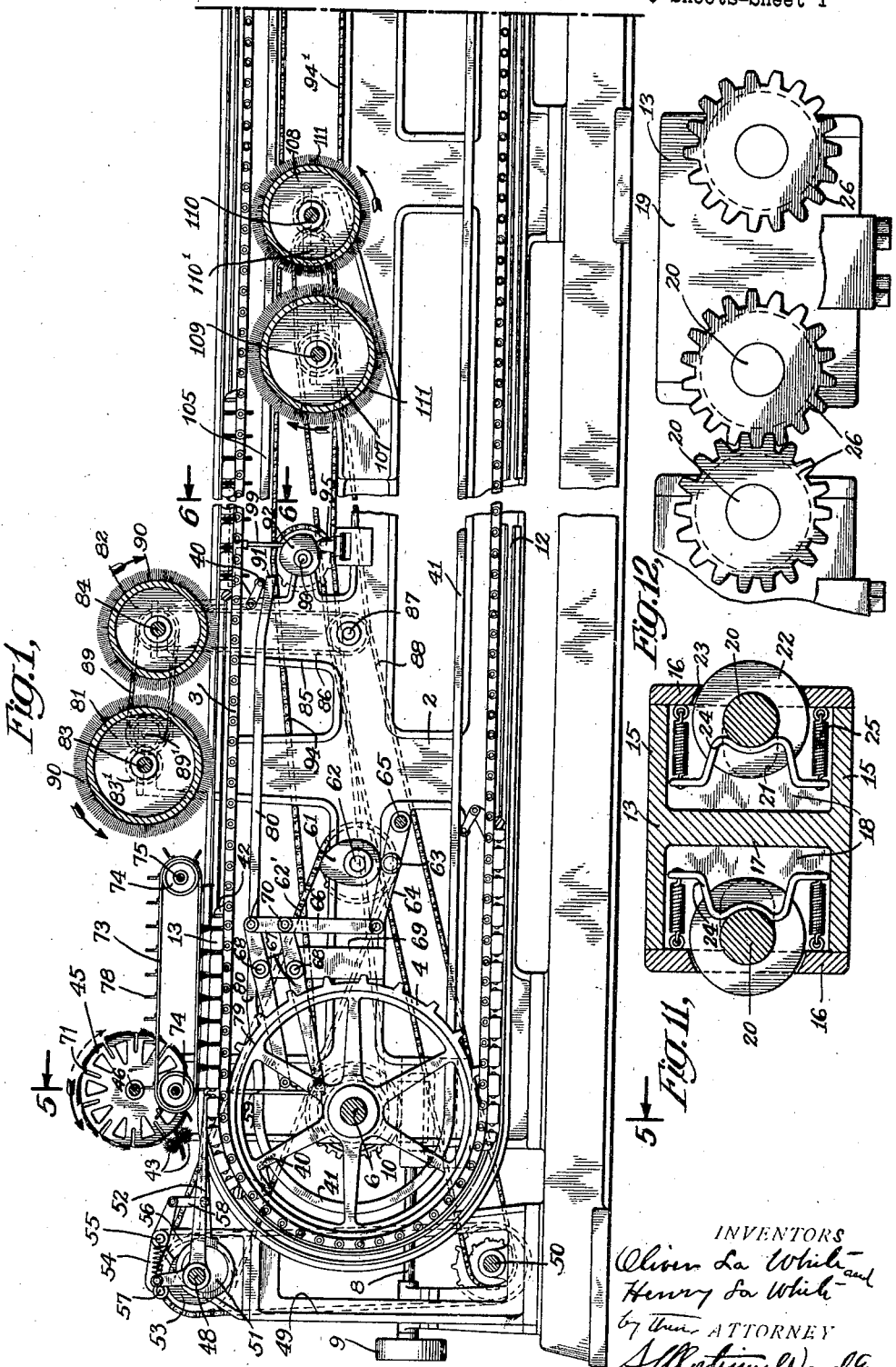

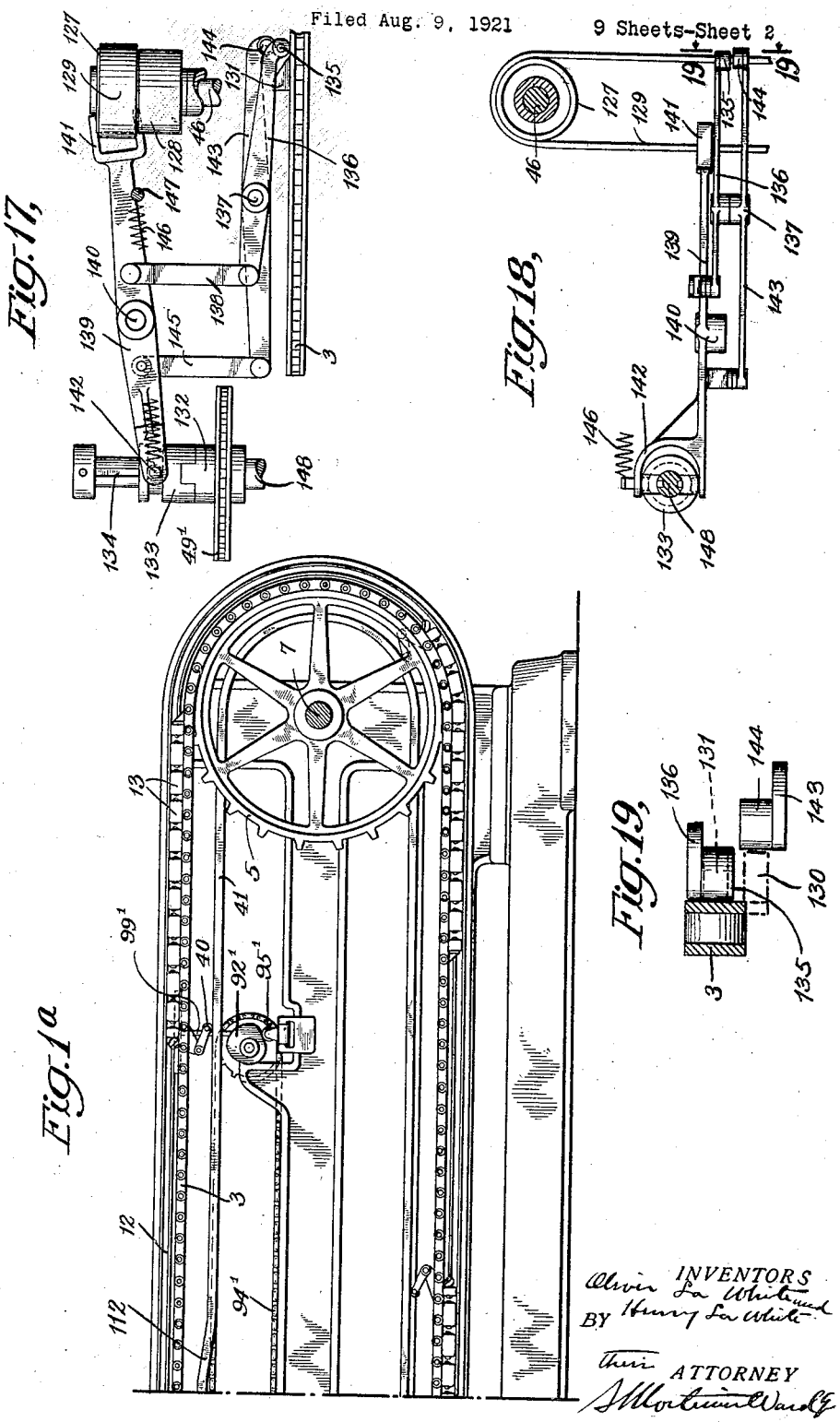

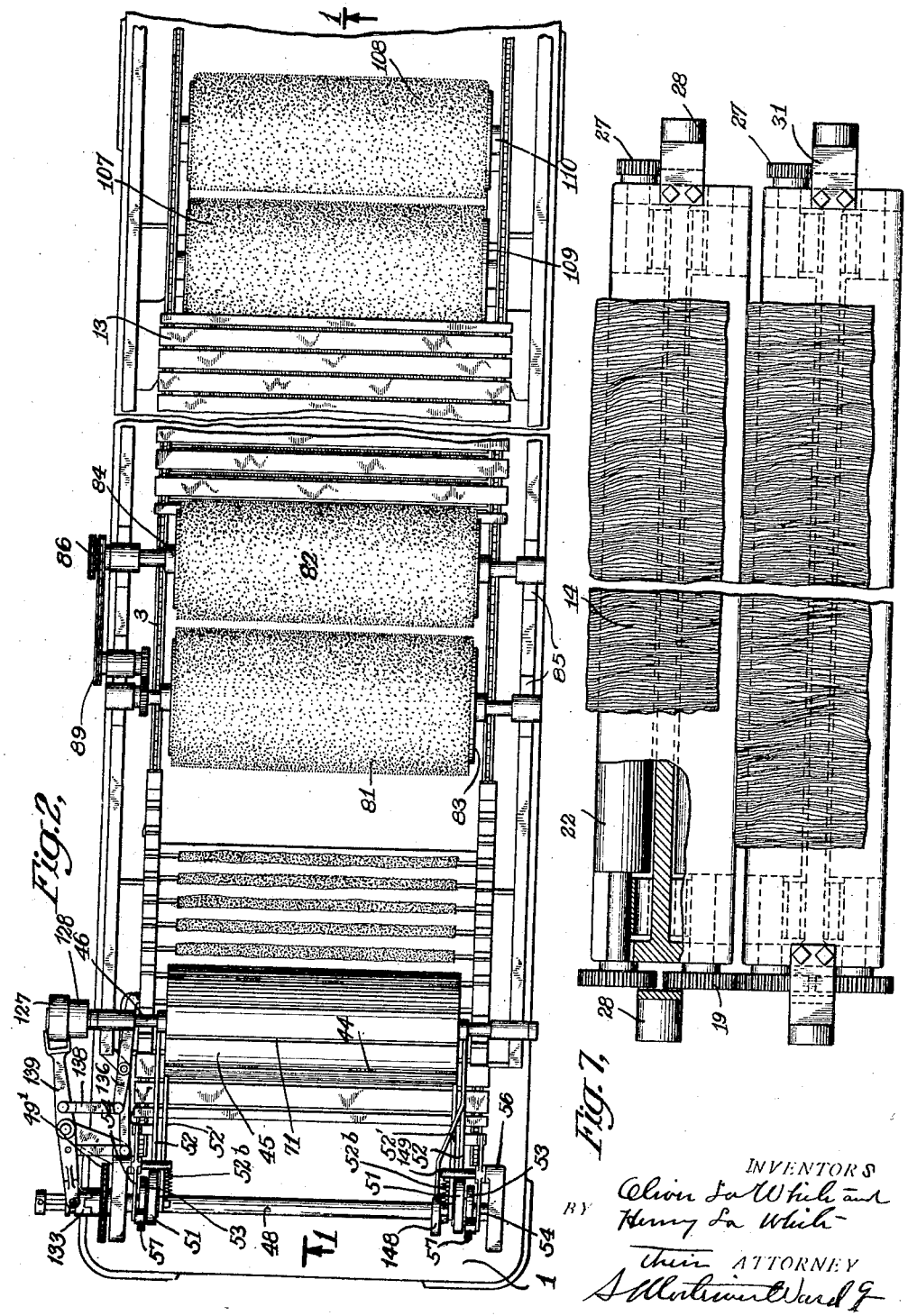

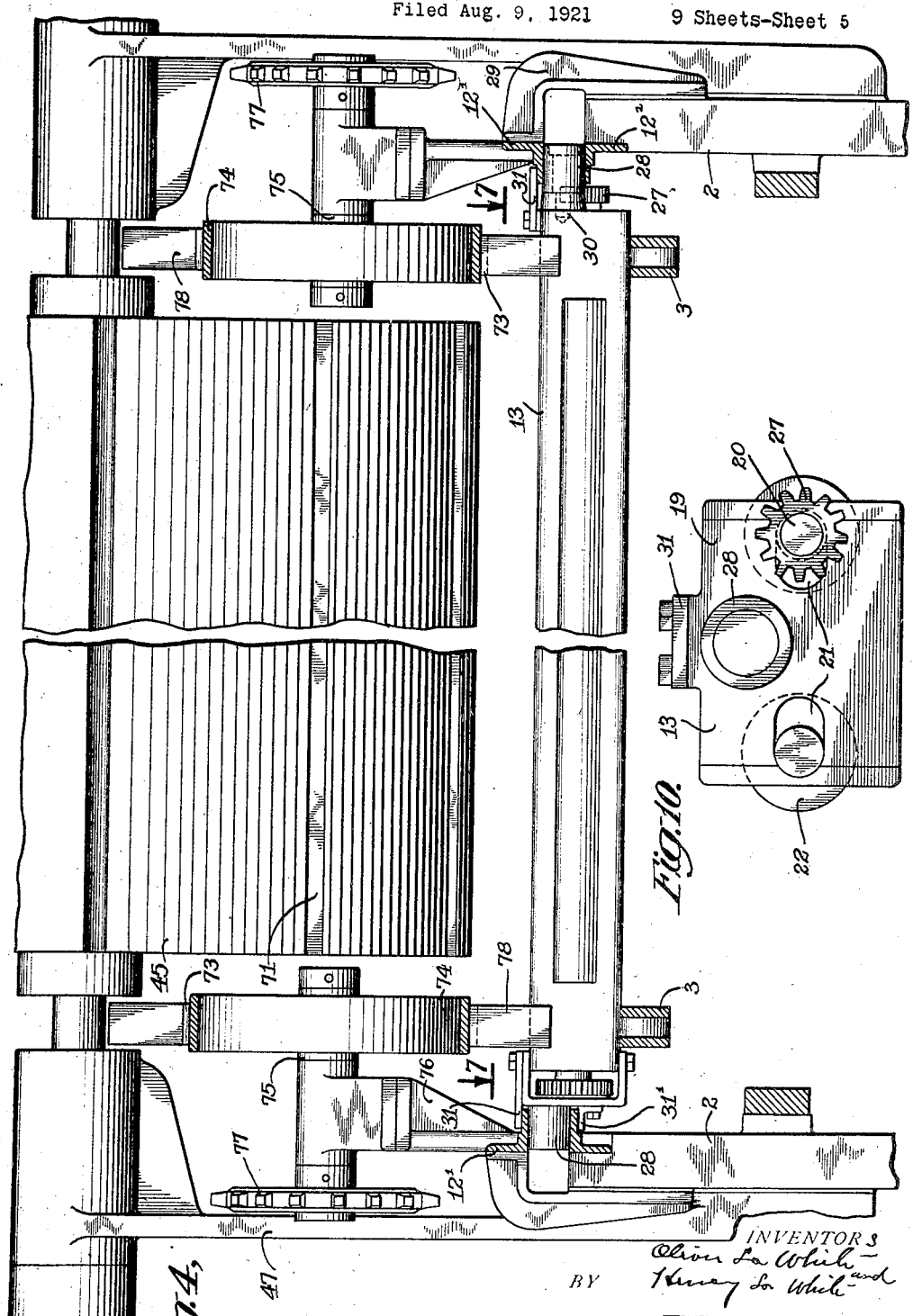

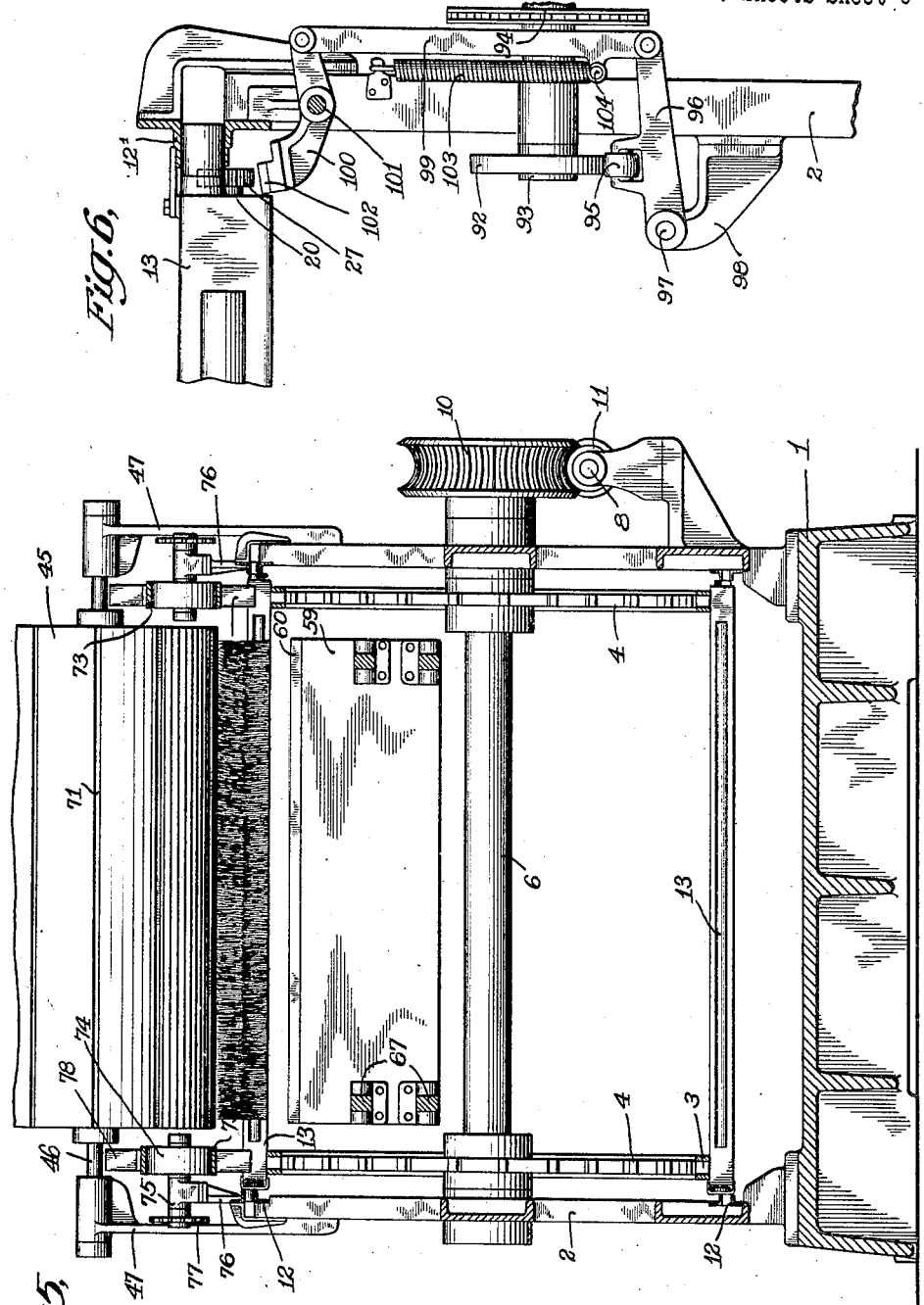

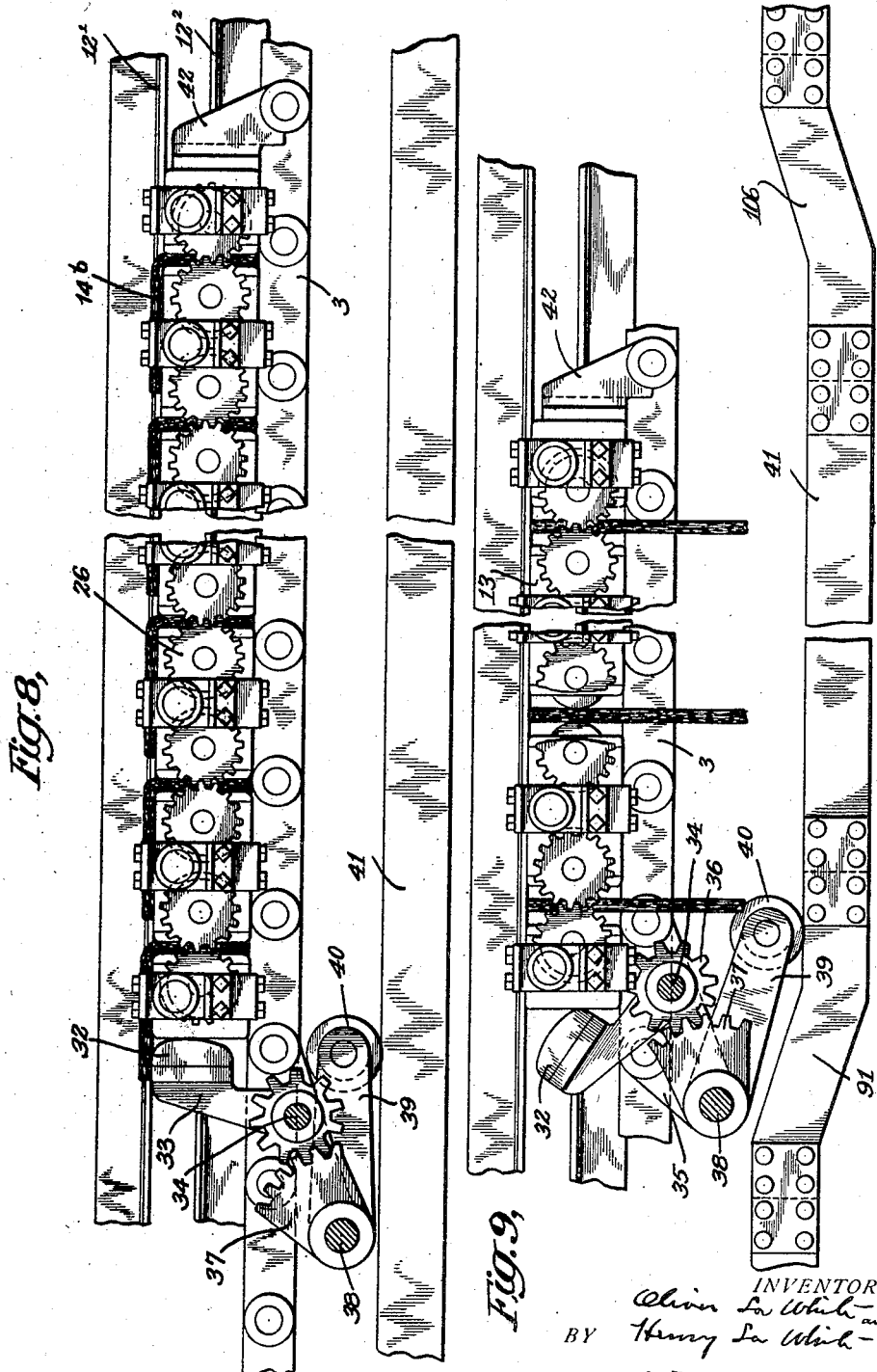

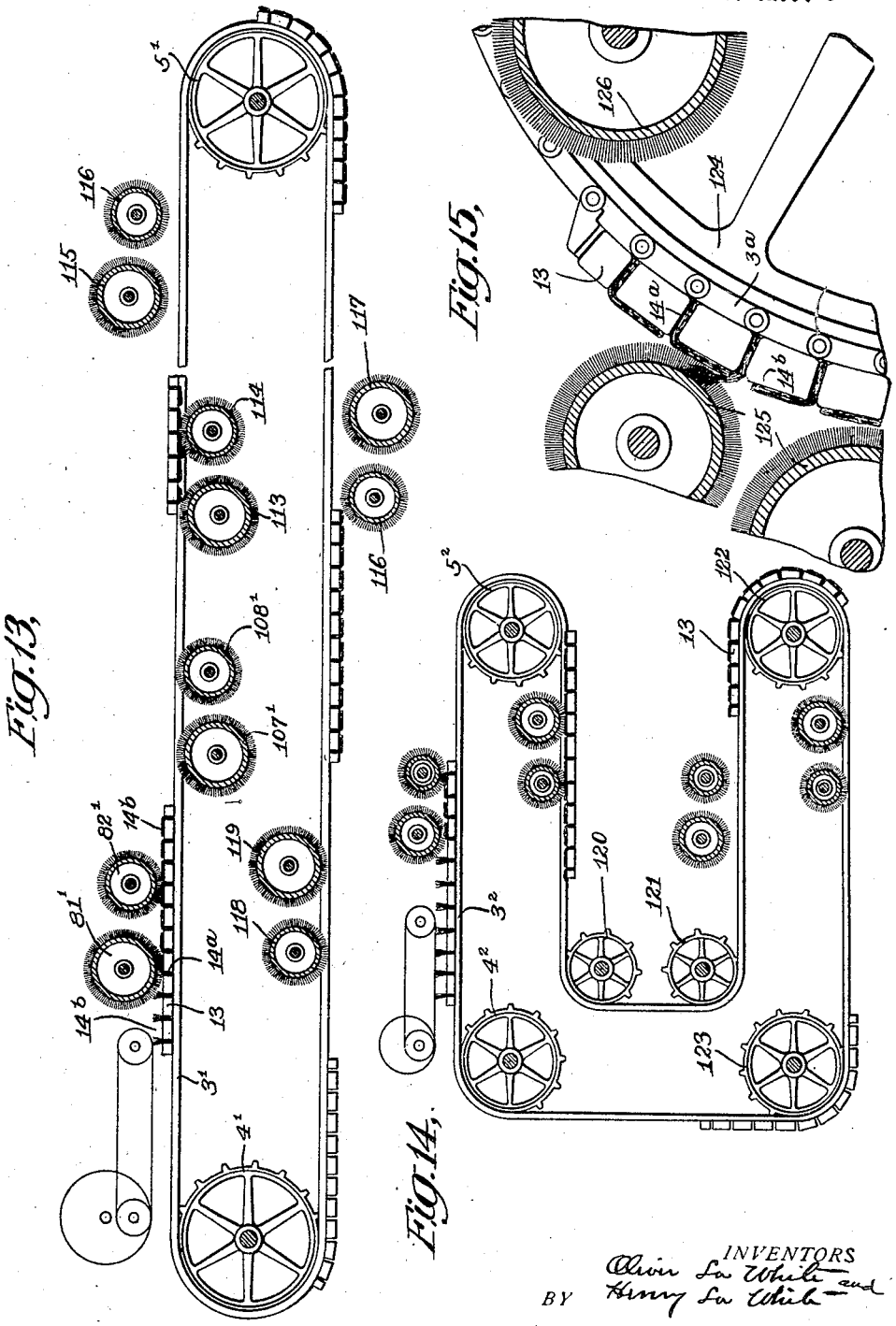

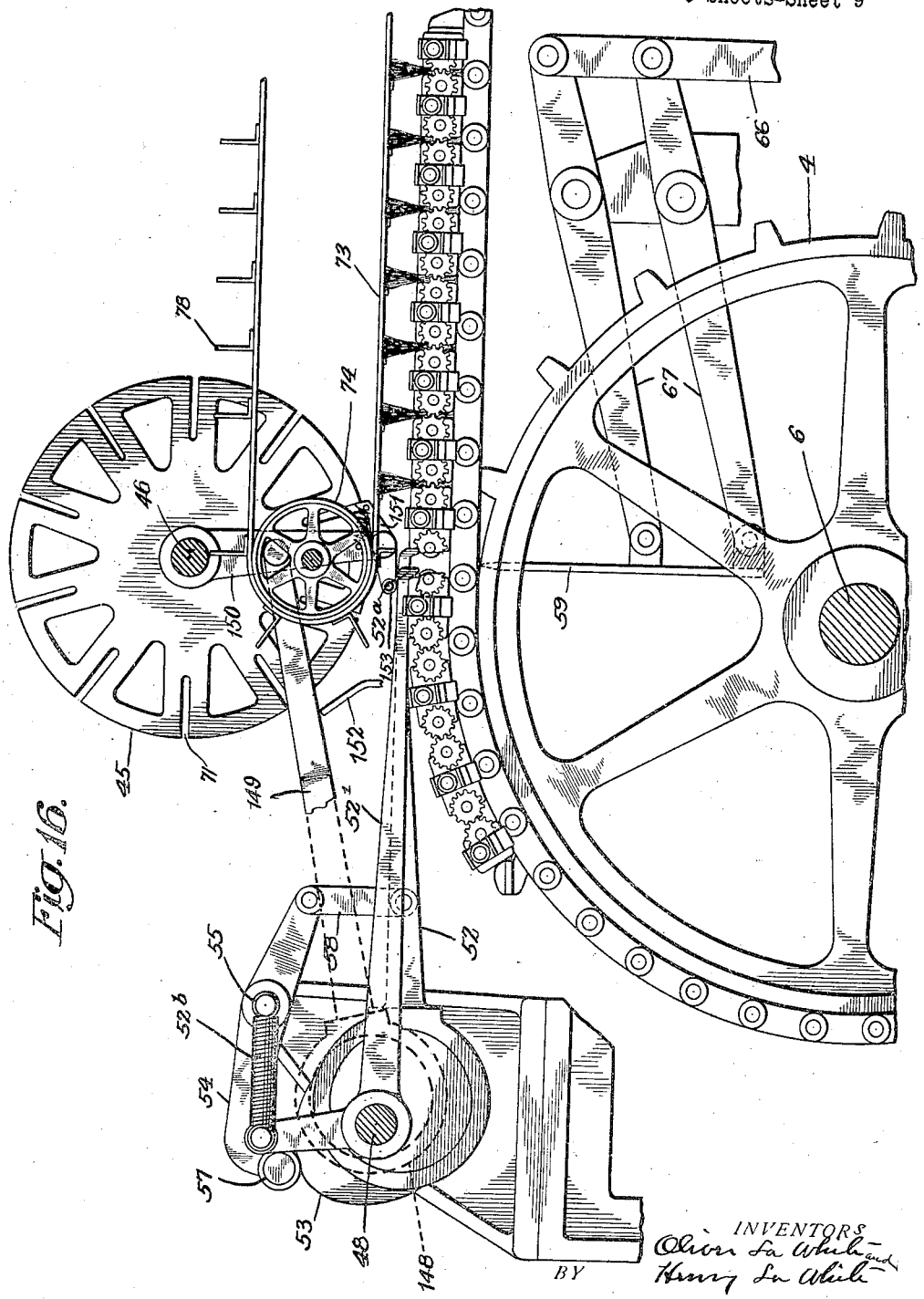

Patented Oct. 30, 1923.

1,472,419

UNITED STATES PATENT OFFICE.

OLIVER LA WHITE AND HENRY LA WHITE, OF GLENS FALLS, NEW YORK.

FIBER-DRESSING APPARATUS.

Application filed August 9, 1921. Serial No. 490,849.

*To all whom it may concern:*

Be it known that we, OLIVER LA WHITE and HENRY LA WHITE, citizens of the United States, and residents, respectively, of 122 Crandall St. and 134 Warren St., Glens Falls, N. Y., have invented certain new and useful Improvements in Fiber-Dressing Apparatus, of which the following is a specification.

The invention relates to fiber dressing apparatus, which is adapted to dress or comb fiber, particularly fiber from which spun silk is to be made.

The invention provides a machine in which bunches of fiber are gripped by gripping means which move relatively to combing or dressing devices. The ungripped or exposed portions of the fiber are dressed or combed, after which the fiber is shifted, and the previously gripped portions of the fiber are then dressed or combed. Preferably automatic devices are provided for inserting bunches of fiber within the gripping means, for shifting the fiber after one portion thereof has been dressed, for clamping or locking the gripping means and unlocking the same at appropriate points or times, and for causing the various movements of the mechanism at properly timed intervals.

An object of the invention is the provision of improved and effective devices of the character referred to. Other objects of the invention are the provision of improved combinations and sub-combinations of elements, and construction of parts, all as will be more fully described in the following specification and claimed in the appended claims.

In order that a clearer understanding of the invention may be had attention is hereby directed to the accompanying drawings forming part of this application, and illustrating, by way of example, certain embodiments of the invention. In the drawings, Fig. 1 is a partial vertical section taken through a machine embodying the invention, Fig. 1 being taken on line 1—1 of Fig. 2; Fig. 1ª is a vertical section of the right hand end of the same, taken on line 1—1 of Fig. 2;

Fig. 2 is a top plan view of the apparatus shown in Fig. 1;

Fig. 3 is an enlarged vertical section illustrating a portion of the mechanism at the forward end of the machine;

Fig. 4 is a transverse vertical section taken on line 4—4 of Fig. 3;

Figs. 5 and 6 are cross sections taken respectively on line 5—5 and 6—6 in Fig. 1;

Fig. 7 is a horizontal section taken on line 7—7 of Fig. 4;

Fig. 8 is an enlarged side elevation illustrating a series of fiber gripping and shifting members closed or locked together after passing the first dressing cylinders;

Fig. 9 is a similar view showing the gripping members in unlocked position;

Fig. 10 is an end elevation of one of the gripping members;

Fig. 11 is a vertical longitudinal section taken through one of the gripping members;

Fig. 12 is an end elevation of one of the gripping members shown in connection with an adjacent gripping member, in position to shift the fiber between the two members, the view being taken from the end opposite to that shown in Fig. 10;

Fig. 13 is a diagrammatic side elevation of a modified form of the apparatus;

Fig. 14 is a similar view illustrating a further modification;

Fig. 15 is a partial side elevation of apparatus embodying a further modification;

Fig. 16 is an enlarged vertical section of the lefthand end of the machine;

Fig. 17 is an enlarged detail plan view of mechanism concerned in the rotation of the feed wheel;

Fig. 18 is a side elevation of the mechanism shown in Fig. 17; and

Fig. 19 is a cross section through one of the traveling chains employed in the machine, this section being taken on line 19—19 of Fig. 17.

The apparatus illustrated in Figs. 1 to 12 inclusive comprises a frame having a suitable base 1 and suitable upright portions 2, 2. A pair of continuous chains 3 pass around sprocket wheels 4 and 5 (Fig. 1ª) which are mounted on shafts 6, 7, carried by the upright portions 2 of the frame. Shaft 6 is illustrated as driven from a horizontal shaft 8 having a driving pulley 9 thereon, connection between shafts 6 and 8 being effected by means of a worm wheel 10 on shaft 6 and worm 11 on shaft 8 engaging with the worm wheel. Any other suitable driving connections might, of course, be used. Sprocket wheels 4, 4, and 5, 5, are carried at opposite ends of shafts 6 and 7 so that the two chains 3 will be carried about the apparatus in parallel relation.

Tracks 12 are carried about the apparatus in parallel relation to each other adjacent and parallel to the chains 3. The blocks or members 13 between which the tufts or bunches of silk or other fiber to be treated are to be gripped, are guided and supported by tracks 12 during their progression about the machine.

For the sake of clearness, a brief general description of the operation of the machine shown in Figs. 1 and 1ª will be given at this point. The traveling chains 3 bring the blocks 13, in separated series or trains, up to the upper level of the lefthand end of the machine as shown in Fig. 1, where the blocks are successively fed beneath a fiber-feeding device. Fiber, (shown in Fig. 3 at 14) is fed between adjacent gripping blocks 13 of a series, from a feed wheel 45, about which the fiber has been positioned during the interval between the passage of two series or trains of blocks. When a sufficient length of the fiber has been drawn between a pair of the adjacent blocks 13, the fiber is automatically cut off by a knife, with portion 14ª of the same extending down between a pair of gripping members 13, and portion 14ᵇ extending above the blocks in exposed position. The blocks 13 moving continuously in a clockwise direction, referring to Fig. 1, the fiber is next drawn between the following pair of blocks 13 and cut off, and then between the next following pair of blocks 13 and cut off, etc., until a tuft or bunch of fiber is positioned between each adjacent pair of blocks 13 in the series. As soon as this has happened, all of the blocks of the series are pushed firmly one against the other and locked, or clamped, in position to firmly grip the bunches of fiber, after which the exposed portions of the fiber are combed or treated by appropriate devices past which the blocks move. The gripping members are then unlocked automatically and permitted to separate somewhat, whereupon appropriate mechanism is brought into operation to shift the bunches of fiber part way through the spaces between the gripping blocks so that the portions of the fiber which were treated will now be between the gripping blocks and the portions which previously were gripped will be below the same. The blocks are now again pressed together and locked, and then these latter portions of the fiber are dressed by dressing or combing devices past which the blocks move, and in the further progression of the series of gripping blocks the blocks are again unlocked and the completely dressed fiber removed, preferably by an automatic mechanism which positively moves the fiber completely out of the spaces between the blocks.

Considering the details of the machine, we will first describe the preferred form of gripping blocks. These blocks 13 are each provided with top and bottom walls 15, 15, front and rear walls 16, 16, and a transverse vertical partition 17 intermediate the front and rear walls, each block being thus provided with front and rear chambers 18, 18, situated respectively between the front wall and the partition 17 and between the rear wall and the partition 17. The blocks are also provided with end walls 19.

Shafts 20, 20, are mounted to extend transversely through chambers 18 of each block, the ends of these shafts extending out through horizontal slots 21 in the end walls 19 of the blocks. Each shaft 20 carries a roller 22, within one of the chambers 18. The front and rear walls 16 of each block are provided with openings 23, through which the rollers 22 are adapted partly to extend. The front and rear rollers 22 are normally spring pressed forwardly and rearwardly respectively so as to partly extend out through openings 23, as is shown in Fig. 11. This may be accomplished by means of bails 24, 24, which have curved portions pressing against shafts 20, the ends of bails 24 being connected by spiral springs 25 to the adjacent walls 16 so as to press rollers 22 into openings 23, shafts 20 sliding forwardly and rearwardly respectively in slots 21.

The outer ends of shafts 20 at one end of the blocks are provided with gears 26, 26, so positioned that the gear at the rear end of one block will mesh with the gear 26 at the forward end of the next succeeding block when shafts 20 are spring pressed into their outermost positions. One of the shafts 20 of each block is provided at its opposite end with another gear 27 (Fig. 10) for engagement with a rack to cause the rotation of rollers 22 to progress the bunches of fiber downwardly between adjacent blocks 13 at the appropriate point in the operation of the machine, as will be hereinafter explained.

Each of the blocks 13 is provided at each end with an outwardly extending roller 28 which is adapted to rotate between the upper and lower portions $12^1$ and $12^2$ of the track 12 previously referred to. The lower track member $12^2$ at each side of the machine may be carried by one of the uprights 2 and the upper track member $12^1$ at each side of the machine may be carried by a bracket 29 secured to upright member 2. Each roller 28 may be rotatably mounted on a pin indicated at 30 extending outwardly from the end wall 19 of a block 13. Each block 13 is also preferably provided at each end with an extension 31 extending over and slidably mounted on the horizontal flange of the adjacent upper track member $12^1$, and at one end with an extension $31^1$ (Fig. 4) slidably mounted on the underside of track member $12^2$, members 31 and $31^1$ being intended to prevent tilting of blocks 13 when they are pushed forward.

Various series of blocks 13 may be employed in the machine, each series of blocks passing through the same cycle of operations. One such series of blocks is indicated at the upper level of the lefthand end of the machine, as shown in Fig. 1, the same series of gripping blocks being understood to be illustrated in Figs. 8 and 9.

Each series of gripping members 13 are pressed together in the guides and pushed around the track by two push members 32 swivelled on the chains 3 and adapted to press against the rear surface of the rearmost block 13 of the series. Each pushing member 32 is secured to, or integral with, arm 33, the opposite end of which has a sleeve portion rotatably mounted on a stud 34 extending transversely from a bracket 35 secured to the chain 3 at each side of the machine. The sleeve portion of each arm 33 carries a pinion 36 secured thereon, which meshes with a sector 37 secured to a stud 38. A forwardly extending arm 39 is also secured to stud 38, this arm carrying at its forward end a roller 40. Each roller 40 is adapted to travel along a "cam track" 41 which extends parallel to the travel of the chains around the machine, as shown, for example, in Fig. 1. A pair of tracks 41 may be employed, one at each side of the machine, suitably secured in position to the side frame members 2. Tracks 41 are provided with raised and depressed portions at suitable intervals which cause rollers 40 to swing sectors 37 about their pivots, thus causing arm 33 and pushing members 32 to swing forwardly or rearwardly, as is indicated in Figs. 8 and 9.

At the forward end of each series of gripping blocks 13 a member 42 is secured to each of the side chains 3 to extend upwardly into position to form an abutment against which the forward block 13 of the series may be pressed, when pushing members 32 are swung forwardly to press the various blocks of the series closely against each other, as is indicated in Fig. 8.

We will now describe the preferred form of mechanism for feeding the fiber to the point at which bunches of fiber are to be gripped by gripping blocks 13. At the forward end of the machine the fiber 14 may be fed forwardly between a pair of rollers 43, from which it is taken by the filler combs 44 fastened on a feed wheel 45, rotatably mounted on a shaft 46, the ends of which are supported by suitable brackets 48 extending upwardly from the side frames 2 of the machine.

Feed wheel 45, in the form of construction shown, rotates rapidly in a counter-clockwise direction, referring to Figs. 1 and 3, during the time the wheel is being filled with fiber, during which time the feed rollers 43 are advancing the fiber at a comparatively slow rate. The combs 44 will thus comb the fiber as the latter is advanced by the rollers, and will catch hold of portions of the same as the fiber passes through the rollers, so that in the course of a number of revolutions of wheel 45 a sufficient amount of fiber will have been caught by the combs and will lie upon the periphery of the wheel, as shown in Fig. 3. The fiber thus caught by the combs will, naturally, taper down in thickness from each comb to a point adjacent the next following comb. The operation described takes place during the interval between the passage of two series or trains or blocks 13 past the feed wheel.

The general manner of operation of the mechanism now being described is as follows. Various series or trains of blocks may be used, all of which travel continuously around the machine, with definite equal intervals between the various trains of blocks. After one train of blocks has had bunches of fiber fed thereto in a manner presently to be described, in the course of which operation all of the fiber will have been taken from feed wheel 45, the feed wheel is again filled with fiber from rollers 43. During this filling of the feed wheel it is moving in a counter-clockwise direction, as stated. When the first pair of blocks of the next following train, or series of blocks, comes into position beneath the feed wheel, the latter, which has now been filled with fiber, will be stopped and rotated step by step in the opposite or clockwise direction for one revolution. During this time bunches or lengths of fiber will be cut off or separated from the periphery of feed wheel 45 and positioned between the various pairs of blocks 13 making up the train. As the last block of the train passes beyond the feed wheel, the clockwise step by step rotation of the latter is stopped and wheel 45 is immediately again rotated rapidly in a counter-clockwise direction so that it will again be filled with fiber by the time that the next train of blocks arrives in positon to receive fiber from the feed wheel. Suitable means may be provided for rotating the feed rollers 43 during the intervals in which feed wheel 45 is rotating in a counter-clockwise direction, rollers 43 being stopped when the counter-clockwise rotation of wheel 45 is stopped.

Feed wheel 45, as shown in Fig. 3, would actually have all the fiber removed from its lower left-hand portion, adjacent to rollers 43, if various bunches of fiber had been inserted between blocks 13 of the train passing the feed wheel, as shown in said figure. The fiber is, however, shown in position on the lower left-hand portion of the wheel in order to illustrate the manner in which rollers 43 and combs 44 cooperate during the filling of the wheel.

The mechanism by which the movements referred to of wheel 45 are effected will be described at a later point.

Means are preferably provided for accurately pushing or adjusting each gripping block into proper position at the point at which the fiber is fed between the blocks. A suitable mechanism is shown in Figs. 1, 2 and 16 in which a sprocket wheel $49^1$ on a shaft 48 is rotated by means of a chain or other connection 49 from a shaft 50 adjacent the base of the machine, shafts 50 and 8 being considered the two power shafts of the apparatus. A pair of eccentric straps 51 are secured to shaft 48, these eccentric straps each having a push finger 52 extend forwardly therefrom.

A pair of cams 53 also rotate with shaft 48. Arms 54 are pivoted intermediate their lengths, as shown at 55, to the brackets 56. Preferably a pair of brackets 56 are provided, one at each side of the machine, between which shaft 48 is supported, there being accordingly a pair of eccentric members 51 and arms 54, one at each side of the machine. Each arm 54 carries a roller 57 which bears against its cam 53. The opposite end of each arm 54 is connected by a link 58 to a finger 52.

The operation of this mechanism will cause the forward ends of fingers 52 to engage behind each block 13 in turn as the latter moves along the upper level of its supporting tracks, to push the block forwardly into a desired position at the feeding point. At the time that fingers 52 come into operation the series of blocks 13 have been pushed up around the curve at the left-hand end of the machine (Fig. 1), by the pushers 32, which latter are then in their rearward position (shown in Fig. 9), so that the blocks of the series will not be pushed tightly together.

Fingers 52 push each block 13 forwardly a definite distance corresponding to the throw of the eccentrics 51, after which links 58 raise fingers 52 out of engagement with the block 13, the fingers retreating, again lowering, and engaging the next block to the rear to push it forward into position, in a continuous operation. The throw of eccentrics 51 is such and the position of the operative end of each finger 52 is so chosen that each block 13 is thereby pushed into a position in which its rear surface has slightly passed the point at which a bunch of fiber is to be drawn down into position as will subsequently be explained.

At the same time the block 13 immediately to the rear of the one which has just been pushed forwardly will, preferably, be held back somewhat by appropriate mechanism, so as to insure having a positive opening between the two blocks to enable the mechanism for drawing a bunch of fiber into position between the blocks to pass between the same.

This mechanism may conveniently take the form of a pair of arms $52^1$ which are pivotally mounted on shaft 48, as is shown in Fig. 16. The forward ends of these arms are provided with downwardly extending noses $52^a$ which are adapted to engage over the upper forward edge of the block 13 immediately to the rear of the one which has just been pushed forwardly by fingers 52. Noses $52^a$ are resiliently pressed downwardly into operative position by suitable means such as springs $52^b$ secured at one end of each of the same to an extension of one of the arms $52^1$, the opposite end of each spring $52^b$ being secured to pivot pin 55 of the adjacent bracket 56. The operation of this mechanism will be more fully explained in connection with the description of the devices for pulling the fiber into position between the blocks and cutting the same off to length, which will presently be described.

It is advisable at this point to describe a mechanism by which the various movements of feed wheel 45 may be effected. A suitable mechanism is illustrated in Figs. 2, 16, 17, 18 and 19. As there shown, shaft 46 of feed wheel 45 may be provided with a pair of pulleys 127 and 128 of which the former may be loose and the latter fast on the shaft. A belt 129 is adapted to run over one or the other of these pulleys and to lead to a suitable power shaft (not shown). The belt will be shifted back and forth by appropriate mechanism so arranged that the belt will run over the fast pulley 128 during the intervals between the passage of trains of blocks 13 past the feed wheel, that is to say, the belt will be used to give wheel 45 its rapid counter-clockwise rotation during the periods in which the fiber is laid upon the wheel.

When the belt is on loose pulley 127 feed wheel 45 may be rotated one revolution, step by step, by a suitable pawl device while the fiber is being cut and fed between the blocks 13. This pawl device may be operated from shaft 48, and this shaft should accordingly be caused to rotate during the periods in which fiber is being fed to blocks 13 and should be stopped during the periods in which feed wheel 45 is being filled with fiber.

The timing of the various movements referred to may suitably be regulated from one of the chains 3 which travel with the blocks 13. One of these chains may be provided with pairs of cam projections 130 and 131 thereon, one pair for each train of blocks, each pair of cam projections being separated from each other in the lengthwise direction of chain 3 by a distance which may be equal to or slightly greater than the length of a train or series of blocks 13.

The chain 49 by which shaft 48 is rotated may extend over a sprocket wheel 49¹ which as shown in Fig. 17 may be mounted on a clutch member 132 which is adapted to engage with clutch member 133 which is keyed to shaft 48 by a key or spline mounted in keyway 134.

During the period in which fiber is fed to blocks 13 shaft 48 must, of course, be rotating and belt 129 must be on the loose pulley 127. Fig. 17 illustrates the mechanism just as one such period is about to end, clutch members 132 and 133 being in engagement. At the end of this period, as the last block 13 of the train passes under the feed wheel, the cam projection 131 on a chain 3 will ride under roller 135 on the end of arm 136 which is pivoted intermediate its length at 137 to a part of the fixed frame. The opposite end of arm 136 is connected by link 138 to an arm 139 which is pivoted intermediate its length at 140 to a point on the fixed frame of the machine. Arm 139 is provided at one end with the belt shifter 141 and at the other end with a yoke 142 by which the movable clutch member 133 may be shifted.

It will be obvious that roller 135 in riding over cam projection 131 will shift belt 129 on to fast pulley 128 and will at the same time unclutch sprocket wheel 49¹ from shaft 48 so that shaft 48 will be stopped and feed wheel 45 will immediately be started in a rapid counterclockwise rotation.

An arm 143, similar to arm 136, is also pivoted on pin 137, arm 143 carrying at its forward end a roller 144. Arm 143 is longer than arm 136 and at its opposite end it is connected by a link 145 to a point on arm 139 which is on the opposite side of the pivot 140 of arm 139 from the point at which link 138 connects to arm 139.

Roller 144 is adapted to engage the other cam projection referred to, 130, which is located on chain 3 a suitable distance to the rear of cam projection 131. The operation of cam projection 131 has shifted the belt on to fast pulley 128 and since the movement of arm 139 has raised link 145, roller 144 will be in the path of cam projection 130 while roller 135 will be raised out of the path of cam projection 130. When cam projection 130 comes along it will raise roller 144 so as to shift belt 129 back on to the loose pulley 127, stopping the counterclockwise rotation of wheel 45, while at the same time clutch member 133 is moved into clutching engagement with member 132 so as to start shaft 48 in rotation. At the same time roller 135 will be moved down into position to be engaged by the next cam projection 131 while roller 144 is raised out of position to be engaged by this cam. The belt shifting and clutch operating arm 139 may be held in each of its two positions by some form of impositive lock such as the spring 146 which is connected at one end to yoke 142 and at the other end to a fixed pin 147. This spring is adapted to swing across the centre 140 in either direction of movement of arm 139 so as to tend to hold arm 139 in each if its two positions.

Cam 130 will come into play to start shaft 48 in rotation as stated at the moment when the first pair of blocks 13 of a train are in position to receive fiber from wheel 45. Wheel 45 may be stopped, as soon as belt 129 is shifted to the loose pulley 127, by any suitable form of friction stop or the like.

The device illustrated in Figs. 2 and 16 for rotating feed wheel 45 in a clockwise direction will then come into play. As illustrated shaft 48 may have an eccentric 148 thereon, this eccentric having a forwardly extending arm 149 which is pivotally connected at its forward end to an arm 150 which is loosely mounted on shaft 46 to extend downwardly therefrom. Arm 150 carries at its lower end a spring pressed pawl 151 which is adapted to engage in radially disposed recesses 71 which are provided at spaced intervals about the periphery of wheel 45. As soon as shaft 48 starts rotating the pawl 151 will engage within one of these recesses 71 and will step wheel 45 around one revolution in a clockwise direction. Recesses 71 are equal in number to the spaces between blocks 13 of a series, into which fiber is to be positioned, as will presently be described. Each revolution of shaft 48 results in moving the train of blocks 13 one block length forwardly, by means of fingers 52, as has been described, each revolution of shaft 48 also resulting in advancing wheel 45 in a clockwise direction the distance between a pair of adjacent recesses 71. When wheel 45 has thus been rotated through one revolution, the next cam projection 131 will come into position to unclutch shaft 48 from its driving connection and to start wheel 45 rapidly rotating in the other direction, as has been described.

During the counter-clockwise rotation of wheel 45, pawl 151 may, of course, be allowed to click over recesses 71 on the wheel. This may be prevented, however, by the provision of a stationary cam surface 152 which is so positioned as to engage a tail portion 153 of pawl 151, when the pawl moves rearwardly after its last engagement with one of the recesses 71. With this arrangement, the design of parts should be so effected that eccentric 148 will come to rest in its rearward position when shaft 48 is stopped and, therefore, cam 152 will serve to hold pawl 151 in this rearward position, out of engagement with the periphery of wheel 45.

The mechanism by which the fiber is pulled into position between the blocks and cut off to length will now be described. Member 59 is mounted vertically below the point at which the fiber is fed downwardly between the blocks, member 59 having a knife edge 60 at its upper edge. Member 59 is given a reciprocating motion, in the form of apparatus illustrated, from a cam 61 mounted on a shaft 62, which may be rotated by a belt or chain connection $62^1$ from shaft 48. Cam 61 bears against a roller 63 carried between arms 64 which are pivoted at their forward ends to a pin 65 journaled between the side frames 2. Links 66 extend upwardly from pivotal connections with the rear ends of arms 64. Parallel links 67 are pivotally connected, as shown at 68, at points intermediate their lengths to upwardly extending brackets 69. The forwards ends of links 67 are pivotally connected, as is indicated at 70, to the vertical links 66, the rear ends of links 67 being pivotally connected to member 59. It will thus be apparent that a parallel motion is imparted to member 59 so that the same will periodically rise and fall during rotation of shaft 48.

Member 59 is provided with barbs 72 at intervals below the cutting edge 60 (Fig. 3). When member 59 rises it will pass between a pair of adjacent blocks 13 at the point at which an opening has been effected between a pair of blocks 13 by the operation of fingers 52 as previously described. Member 59 on thus rising will cut through the fiber on wheel 45 adjacent to one of the filler combs 44. At this time one of the recesses 71, such as the recess $71^1$ shown in Fig. 3, will be in alignment with the knife so that at the top of the upward movement of member 59 its knife edge 60 will pass through the fiber and will enter to a slight extent into the recess $71^1$ referred to. The member 59 then descending will draw down with it the end portion of the fiber shown at $14^1$ in Fig. 3, which has just been severed from the fiber on the feed wheel. This fiber will, of course, be thus pulled down because of the engagement therewith of barbs 72 on member 59. This length of fiber will thus be drawn between a pair of blocks $13^a$ and $13^b$ (Fig. 3). During the further movement of member 59 block $13^b$ will be pushed forwardly against the portion of fiber $14^1$ referred to and will push the block $13^a$ and the other blocks of the train in front of that forwardly, as has been described, the operation of fingers 52 resulting in placing the block $13^b$ in the position shown in Fig. 3 as occupied by block $13^a$.

When members 59 next rises it will accordingly pass through the space between block $13^b$ and the block immediately to the rear of that. At this time the recess indicated at $71^2$ in Fig. 3, immediately to the right of recess $71^1$, will be in alignment with member 59, so that the latter in rising will pass through the fiber on the wheel immediately to the right of the filler comb indicated at $44^1$ and will enter recess $71^2$. Accordingly the length of fiber first pulled into position will be entirely severed from the fiber on wheel 45 and the next length of fiber on the wheel, indicated in Fig. 3 at $14^2$, will be pulled down into position between the next pair of blocks.

As has been stated, when member 59 rises between a pair of blocks 13 in the manner referred to, an opening will be provided for its passage between the blocks because of the fact that fingers 52 have just pushed a block, for example the block $13^a$ in Fig. 3, slightly ahead of the plane in which member 59 operates, while spring pressed fingers $52^1$ have prevented block $13^b$, immediately to the rear of the point at which member 59 operates, from advancing into contact with block $13^a$. When fingers 52 next move forwardly again they will push block $13^b$ forwardly, spring pressed arms $52^1$ rising to permit this movement, block $13^b$ being pressed by fingers 52 against the length of fiber extending between blocks $13^a$ and $13^b$ and, therefore, pressing all of the blocks of the series in advance of block $13^b$ forwardly. Block $13^b$ will be advanced by fingers 52 until its rear edge is slightly in advance of the vertical plane in which member 59 operates, the block immediately to the rear of block $13^b$ in turn being held by spring pressed arms $52^1$ from advancing quite into contact with block $13^b$. The feeding rollers 43 may be started into operation when wheel 45 begins to rotate in a counter-clockwise direction and may be stopped when the counter-clockwise rotation of wheel 45 is stopped. This may, of course, be accomplished by a suitable connection between shaft 48 and the shafts of feed rollers 43.

While the bunches of fiber are being inserted between the blocks, the pushing members 32 at the rear of the series are in their open positions shown in Fig. 9, and there might be some danger of the fiber falling out from between the blocks. Accordingly we prefer to provide a supplemental mechanism which will hold the blocks, between which fiber has been inserted, pressed against each other with sufficient force until the fiber has been inserted between all of the pairs of blocks of the series.

This supplemental mechanism preferably takes the form of a pair of belts 73, 73, which are mounted above and parallel to blocks 13. Belts 73 pass over pulleys 74 on stud shafts 75 which may be supported by suitable brackets from the side frames 2, brackets 76 for the rear stud shafts being shown in Fig. 5. Stud shafts 75 may be driven by any suitable means such as chains passing over sprocket wheels 77 on the rear stud shafts 75. These chains are not illustrated, in order not to unnecessarily complicate the drawings, but they may extend downwardly to suitable sprocket wheels on shaft 6, the drive being so arranged that the lower course of belt 73 will move forwardly over blocks 13 at the same speed as chains 3.

Belts 73 carry fingers or lugs 78 at spaced intervals thereon, and these lugs are adapted to each engage behind one of the blocks 13 immediately after the latter has been delivered by fingers 52 to the point at which its rear edge is slightly in advance of the vertical plane in which member 59 operates. as previously described. Lugs 78 will hold blocks 13 pressed against each other and against the travelling abutment 42 at the front of the series of lugs with sufficient firmness to hold the bunches of fiber in position between adjacent blocks 13 until the pushing members 32 move forwardly to positively clamp the blocks together.

The locking together of blocks 13 will now be described. Rollers 40 of the pushing mechanism at the rear of the series of members 13 are riding up the lefthand end portions of tracks 41 (Fig. 1), while the fiber is being positioned between the blocks, pushers 32 being in their rearward position shown in Fig. 9. As the last pair of blocks of the series receives its fiber, rollers 40 will move up an inclined portion 79 of each track 41 so as to ride upon the horizontal top portions 80 of the tracks. As rollers 40 reach the upper level 80 of the tracks, arms 33 will be swung forwardly into the position shown in Fig. 8. This results in squeezing the various blocks 13 of the series tightly against each other so that all of the rollers 22 will be forced entirely into the recesses 18 within the blocks, and so that the bunches of fiber will be firmly gripped between the front and rear vertical walls 16 of adjacent blocks, the blocks being clamped between pushers 32 at the rear and members 42 at the front of the series of blocks. The blocks will remain locked in this position as long as rollers 40 travel along the raised portions of cam tracks 41.

The bunches of fiber thus being firmly held in position, the blocks pass beneath the combing or dressing cylinders 81 and 82 which are mounted on shafts 83, 84, supported in upwardly extending portions 85, 85, of the side frames. The forward shaft 84 may be rotated by belt or chain connection 86 from a shaft 87 which is supported between the side frames, shaft 87 being rotated by chain connection 88 extending around a suitable sprocket on shaft 50. Combing cylinders 81 and 82 preferably rotate in opposite directions and accordingly cylinder 81 may be rotated by a belt or chain connection 89 extending from shaft 84 around a pulley or sprocket wheel on a shaft $89^1$ on which is fastened a suitable pinion which engages with a pinion $83^1$ on shaft 83, as is indicated in dotted lines in Fig. 1, so as to reverse the direction of rotation of cylinder 81. Cylinders 81 and 82 are provided with suitable combing or dressing devices 90 which brush against the portions $14^b$ of the bunches of fiber which extend upwardly above the upper surfaces of blocks 13. With the directions of rotation indicated by the arrows in Fig. 1 the dressing cylinder 81 will brush portions $14^b$ of the fiber forwardly so as to comb one side of the same and the dressing devices of cylinder 82 will brush portions $14^b$ of the fiber rearwardly so as to brush the opposite side of the fiber. Fig. 8 illustrates blocks 13 of a train of blocks which has just passed dressing cylinder 82 so that all of the upper portions $14^b$ of the fiber will be lying on top of the blocks and extending rearwardly from the gripped portions $14^a$ of the fiber.

As soon as all of the bunches of fiber have been combed by combing devices on cylinder 82, the rollers 40 will ride down an inclined portion 91 in each of tracks 41 so as to unlock the blocks 13 of the series. This is for the purpose of enabling the bunches of fiber to be shifted into new positions between blocks 13, so as to enable the combing of the previously clamped portions of the fiber.

A cam 92 is carried by shaft 93 at a point adjacent to the depression 91 in one of the tracks 41, shaft 93 being rotated by appropriate means such as a chain 94 extending around sprockets on shafts 93 and 6. Shaft 93 may be merely a stud shaft extending from one of the side frames of the machine, (Fig. 6).

A roller 95 is positioned to bear against the lower surface of cam 92, roller 95 being carried by an arm 96, which is pivotally mounted at one end, as shown at 97, to a bracket 98 extending from one of the side frames of the machine. The opposite end of arm 96 is connected by a vertical link 99 (Fig. 6), to a bell crank 100, which is pivotally mounted intermediate its length, as shown at 101, to the side frame.

The opposite end of bell crank 100 carries a rack 102 which is adapted to be moved into mesh with the pinions 27 which are mounted on the forward shafts 20 carried by gripping blocks 13. Roller 95 is held in engagement with cam 92 by suitable means, such as a spring 103, which may be secured at one end to a lug 104 on link 99, the other end of the spring being secured to the side frame member.

Cam 92 is so timed that it will depress roller 95 to throw rack 102 upwardly into engagement with all of the pinions 27 as soon as the blocks 13 of the series have arrived in position for their pinions 27 to be above rack 102, at which time the blocks 13 have just been unlocked by rollers 40 riding down the inclined portion 91 of the tracks, as described. Rack 102 will be held elevated in engagement with all of the pinions 27 of the series of blocks for a definite interval, during which pinions 27 will revolve as blocks 13 move forward. Roller 95 then rides off the high portion of cam 92 so that rack 102 drops out of engagement with pinions 27.

While the blocks 13 of the series were locked together the vertical lower portions 14ª of the bunches of fiber were gripped between the front and rear walls 16 of adjacent blocks 13, as stated. When the blocks 13 are unclamped by rollers 40 riding down inclined surfaces 91 of tracks 41, the blocks are pushed somewhat apart from each other by the pressure of springs 25 within the blocks so that the bunches of fiber will be held between the surfaces of rollers 22 of adjacent blocks. The bunches of fiber will be held with sufficient firmness by rollers 22 at this time because of the fact that pushing members 32, when they move from the locked position shown in Fig. 8 to the unlocked position shown in Fig. 9, still remain in engagement with the rear surface of the rearmost block 13 of the series, the blocks 13 being permitted to move apart sufficiently by the rearward movement of pushing members 32 to move the vertical surfaces 16 out of gripping engagement with the bunches of fiber, while gripping contact is still maintained by rollers 22 against the front and rear portions of the bunches of fiber.

All of the shafts 20 on which pinions 27 are mounted will be rotated by the rotation of pinions 27, as described. Pinions 27, as stated above, are mounted on the shafts 20 at the front end of each block 13, and each of these shafts 20 carries at its opposite end a pinion 26, which will mesh with the pinion 26 on the shaft 20 at the rear of the block immediately in front thereof, when the blocks are somewhat separated from each other as they will be at this time. Accordingly all of the rollers 22 will be rotated in the proper directions to positively feed the bunches of fiber held between the same downwardly for sufficient distances to cause each portion 14$^b$ of the fiber, which had previously been dressed, to be moved down between the two adjacent blocks, while the portions 14ª of the fiber which previously had been gripped between the blocks, are moved down into a position below the blocks, as is shown in Fig. 9.

The blocks are now again locked together by rollers 40 riding up inclined portions of tracks 41 on the upper level of the tracks indicated in Fig. 1 at 105. The track 41 is shown as broken away in Fig. 1 at the point referred to, for the sake of clearness, and, therefore, the upwardly extending inclined portion thereof, just referred to, is not shown in Fig. 1 of the drawings, but may be considered to be the inclined portion 106 shown in Fig. 9.

The blocks 13, in their continued progress are now carried past rollers 107 and 108 which are mounted on shafts 109 and 110 respectively, which shafts are carried by upward extensions of the side frames. These shafts may be rotated by appropriate connections, such as the chain 88, which may extend over a suitable sprocket wheel on shaft 109 and around a suitable sprocket wheel on a shaft 110$^1$ adjacent to shaft 110. A pinion on shaft 110$^1$ will mesh with a suitable pinion on shaft 110, as is indicated by dotted lines in Fig. 1, so as to give cylinder 108 a direction of rotation opposite to that of cylinder 107. Chain 88 was previously described as rotating shaft 87 from shaft 50 and, as shown in the drawings, it may be continued past shaft 109 and around a sprocket on shaft 110$^1$. Rollers 107 and 108 carry suitable combing, or other dressing devices, 111, positioned about their peripheries.

The combing devices carried by rollers 81 and 82, previously described, combed or dressed the portions 14$^b$ of the bunches of fibers as the latter extended above or lay upon the upper surfaces of blocks 13. The bunches of fiber now having been shifted, rollers 107 and 108 will comb or dress the portions 14ª of the bunches of fiber, the latter being pressed against the under surfaces of blocks 13, in one direction or the other, by the combing rollers as the bunches of fiber are carried past the same. Rollers 107 and 108 may rotate in the directions shown by the arrows, Fig. 1, so as to suitably comb the fiber which is carried above the same, travelling toward the right, Fig. 1.

The bunches of fiber having thus been entirely dressed, blocks 13 of the series will travel to the point at which the dressed fiber will be discharged therefrom. Preferably this is accomplished in an automatic manner. Preferably the sprocket wheel 5 over which chains 3 pass at the extreme right hand end of the machine is positioned far enough beyond dressing cylinder 108 to provide room for the discharge of the dressed fiber from a train of blocks 13. As is illustrated in Fig. 1ª, which may be considered as a continuation of Fig. 1, rollers 40 will ride down inclined portions 112 of tracks 41, after all of the blocks of a train have passed dressing cylinder 108. This will serve to unlock the train of blocks. The blocks being thus unlocked the dressed fiber may be removed therefrom. Preferably this is accomplished automatically by means which will rotate all of the rollers 22 of the blocks in the same direction in which they were rotated when the fiber was shifted downwardly between the blocks after passing dressing cylinder 82. This further shifting of the fiber to discharge the same may be accomplished by mechanism entirely similar to that which has been described in connection with the first shifting of the fiber. Thus a cam 92¹ (Fig. 1ª), may be provided, this being similar to cam 92 previously described, cam 92¹ being rotated by appropriate means such as a chain 94¹ extending around a sprocket on the shaft of cam 92¹ and around a suitable sprocket on shaft 93. Chain 94¹ may, of course, be a continuation of chain 94.

The roller 95¹ is positioned to bear against the lower surface of cam 92¹. A vertical arm 99¹ is operated by roller 95¹ in the same manner that vertical link 99 is operated from roller 95 (Fig. 6), previously described. The movement of vertical arm 99¹ serves to operate a rack which will engage the pinions 27 of the series of blocks in the same manner as has previously been described in connection with rack 102, illustrated in Fig. 6. The result of this action will be to rotate all of the rollers 22 of the blocks so as to automatically discharge or eject the entirely combed flag of fiber from the blocks of the series. The blocks will then continue around sprocket 5 and back to the starting point of the machine at which fresh bunches of fiber to be dressed will be inserted between the blocks and the operation as previously described repeated.

The mechanism described may, of course, be enlarged so as to provide for repeated dressings of the fiber. One such modification is illustrated diagrammatically in Fig. 13, in which the blocks 13 are indicated as being progressed past dressing rollers 81¹ and 82¹ which will dress the portions 14ᵇ of the fibers, and then past dressing rollers 107¹ and 108¹ which will dress the portions 14ª of the fibers, the fibers having been shifted in the meanwhile by a mechanism similar to that previously described.

The fibers may now be again combed or dressed, by finer combing or dressing rollers 113 and 114 which are similar to dressing rollers 81¹ and 82¹. The fibers may then again be shifted in the manner previously described, back to their original positions, so that the portions 14ᵇ of the fibers may again be dressed by dressing rollers 115, 116, situated above the upper course of the blocks 13. The same operation may be repeated as many times as desired, additional dressing rollers 116, 117, and 118, 119, being indicated as mounted respectively beneath and above the lower course of blocks 13. In this schematic representation the chains 3¹ are indicated as passing around sprockets 4¹ and 5¹ which are situated a considerable distance apart so that the blocks will travel forwardly in one horizontal course, and return in a lower horizontal course. It has not been deemed necessary to illustrate the details of mechanism in this figure, since the same will be entirely similar to the mechanism already described. When the bunches of fiber have been shifted, in the manner previously described, to enable dressing rollers 107¹ and 108¹ and 113, 114, to dress the portions 14ª of the fibers, it will, of course, be necessary to shift the fibers back again into the position they occupied when they were dressed by rollers 81¹ and 82¹. This may, of course, be accomplished by a mechanism similar to that illustrated in Fig. 6, in which, however, the rack will engage the opposite sides of the pinions 27 so as to reverse the direction of the rotation of rollers 22.

A modified arrangement is illustrated in Fig. 14 which may be considered as substantially the same as that shown in Fig. 13, except that the apparatus is located in two floors of a building, or at two different levels, so as to prevent the apparatus from requiring as great length as is called for by the arrangement shown in Fig. 13. As is indicated in Fig. 14, the chains 3² may pass on one level around sprockets 4² and 5², then return below that course, pass about sprockets 120, then extend downwardly and pass about sprockets 121, then extend in a horizontal course to the right and pass about sprockets 122, then extend to the left in a horizontal course and, passing about sprockets 123, then vertically upwards about sprockets 4². Suitable combing or dressing rollers may be positioned to dress the fiber at the various horizontal levels referred to, as indicated. Cam tracks similar to tracks 41 will, of course, extend about the apparatus in courses parallel to those of chains 3² and be provided with suitable inclined portions for causing the bunches of fiber to be shifted in one direction or the other, as previously described.

In Fig. 15 another modification of the apparatus is indicated. As here shown, the apparatus may be the same as that previously described, except that the blocks 13 are progressed through a circular path instead of being carried through horizontal courses, as previously described. As is indicated in Fig. 15, the blocks 13 may be guided for travel about the periphery of a large drum 124, dressing rollers 125, 125, being indicated as positioned to comb or dress the portions 14ᵇ of the bunches of fiber and dressing roller 126 positioned to dress the portions 14ᵃ of the bunches of fiber after the latter have been shifted. In this construction the drum 124 may be held stationary and the blocks 13 progress around the periphery of the same in the manner already described, the bunches of fiber being shifted at suitable points by mechanism similar to that previously described, which may comprise rollers bearing on tracks having inclined portions, these rollers being carried from the chains 3ᵃ in the manner previously described. Or, of course, the blocks 13 may be progressed in their circular path by causing the drum 124 itself to rotate in which case the cam tracks referred to would be stationary, the blocks being progressed through their circular path by means of pushing devices similar to the devices 32, previously described; which may be pivotally connected to the periphery of the drum 124.

It should be understood that the invention is not limited to the details of construction which have been particularly described, but that the same is considered as including such equivalents of the mechanism particularly described as will occur to those skilled in the art, the scope of the invention being indicated by the accompanying claims.

What we claim is:

1. In fiber dressing apparatus, the combination of a pair of gripping members, one behind the other, a dressing member, means for causing relative movement between said gripping and dressing members, such that said gripping members will successively pass said dressing member, relatively, means for pressing said gripping members together to grip fiber therebetween with the fiber extending transversely of the direction of said relative movement, with a portion exposed, until said portion has been dressed, and means for thereafter shifting the fiber between said members transversely of the direction of said relative movement.

2. In fiber dressing apparatus, the combination of a pair of gripping members, means for progressing the same along a path, said members being one behind the other in their direction of movement, means for locking the same together as they pass one point on the path, to clamp fiber therebetween, extending transversely of said path, means for unlocking the same at a subsequent point, and means carried by said members and coacting fixed means for shifting the fiber between said members transversely of the direction of said path, when said members are unlocked.

3. In fiber dressing apparatus, the combination of a pair of following gripping members, means for progressing the same, one after the other, along a path, means for pressing the same together, as they pass one point on the path, to grip fiber therebetween extending transversely of said path, and to hold them so pressed for a distance, and means for releasing the pressure and shifting the fiber transversely of said path, between said members at a subsequent point.

4. In fiber dressing apparatus, the combination of a pair of gripping members, means for progressing the same, one after the other, along a path, means for pressing the same together, at one point on the path, to grip fiber therebetween, extending transversely of said path, and to hold them so pressed for a distance, means for releasing the pressure at a subsequent point, means adjacent such point and means carried by at least one of said members adapted to coact with said last named means to shift the fiber transversely of said path, between said members.

5. In fiber dressing apparatus, the combination of a pair of adjacent rollers one behind the other, means for progressing the same along a path, means for dressing, at one point in the path, an exposed portion of fiber another portion of which extends between said rollers transversely of said path, and means for causing said rollers to rotate at a subsequent point to shift the fiber, transversely of said path, to expose the portion thereof which was not dressed by said dressing means.

6. In fiber dressing apparatus, the combination of a continuous track, a train of more than two gripping members movable thereabout one after the other, means for progressing the same, and means, operable at intervals during the progress of said members, for inserting fiber transversely of the direction of movement of said members between adjacent members with portions of the same exposed, locking said members together to grip the fiber, treating the exposed portions of fiber, unlocking said members, shifting the fiber transversely of the movement of said members between said members to expose the portions previously gripped, again locking said members together, and treating the portions of fiber then exposed.

7. In fiber dressing apparatus, the combination of gripping means having opposite surfaces, said means being adapted to grip a bunch of fiber with a portion of the same extending beyond one of said surfaces, means for dressing said portion as it lies against said surface, means for thereafter shifting said bunch of fiber so that the portion thereof previously gripped will extend beyond the opposite surface of said gripping means, and means for dressing said portion as it lies against said last named surface.

8. In fiber dressing apparatus, the combination of a pair of members adapted to grip a bunch of fiber between them with a portion of the same extending above the upper surfaces of said members, means for dressing said ungripped portion, means for thereafter shifting the fiber downwardly so that the portion previously gripped will extend below said members, and means for thereafter dressing said last named portion.

9. In fiber dressing apparatus, a gripping member comprising a block having a chamber therein and a wall having an opening extending into said chamber, a roller in said chamber, and spring means tending to press said roller outwardly through said opening.

10. In fiber dressing apparatus, the combination of a pair of gripping blocks having adjacent vertical surfaces having openings therein, said blocks having chambers therein, rollers in said chambers spring pressed into and partly through said openings, means for clamping said blocks together so that fiber between the same will be clamped between said vertical surfaces, and means for holding said blocks somewhat apart, when unclamped, so that said rollers will engage the fiber.

11. In fiber dressing apparatus, the combination of a pair of adjacent rollers, gripping members adjacent the same, means for clamping said members together with fiber extending between the same and between said rollers, and means for resiliently pressing said rollers against opposite sides of the fiber when said members are unclamped.

12. In fiber dressing apparatus, the combination of gripping means, means for feeding a supply of fiber thereto, and means for inserting a length of fiber into position to be gripped by said gripping means, cutting the same off, inserting the next length of fiber into position to be gripped by said gripping means, at a spaced interval from said first length, and cutting the same off, automatically.

13. In fiber dressing apparatus, the combination of a series of gripping members, means for feeding a continuous supply of fiber adjacent the same, and means for drawing a length of fiber between a pair of said members, cutting the same off from the supply, drawing the next length of fiber between a following pair of said members, cutting the same off, and so continuing until a desired plurality of lengths of fiber have been so positioned.

14. In fiber dressing apparatus, the combination of a series of more than two gripping members, means for automatically positioning bunches of fiber between successive pairs of said members respectively, and means for then automatically clamping all of said members together.

15. In fiber dressing apparatus, the combination of a series of following gripping members, a track over which they move, pushing means for said members, and means, including said pushing means, for clamping said members together at a point in their travel.

16. In fiber dressing apparatus, the combination of a series of following gripping members, a track over which they move, a traveling front member, spring means tending to separate said gripping members, and means operable at one point to move forwardly, relatively to said gripping members, to press the same against each other and said front member, and at a subsequent point to recede relatively to said gripping members.

17. In fiber dressing apparatus, the combination of a series of following gripping members, a pushing device traveling behind said members, an abutment constantly traveling in front of said members, and means for moving said device forwardly and backwardly, relatively to said abutment, at points in the travel of said members, to clamp and unclamp the same, and for holding said device in its relatively forward or back position for intervals of travel, to maintain said members in clamped and unclamped position, respectively.

18. In fiber dressing apparatus, the combination of a series of gripping members, means for pushing the rear one of the series along a path, means for feeding fiber between said members at one point, and independent pushing means for pushing each one of said members separately slightly past said point immediately before fiber is fed to said point.

19. In fiber dressing apparatus, the combination of a series of gripping members, means for pushing the whole series along a path, a member movable across said path at one point, adapted to draw bunches of fiber between adjacent gripping members, and means for so adjusting the positions of said gripping members that one of the same will be in front of, and one immediately behind, the line of travel of said last named member, with a space between them, whenever said last named member so moves in its fiber drawing operation.

20. In fiber dressing apparatus, the combination of gripping members, adapted to hold fiber therebetween with a portion of the same exposed at one side of the members, means for moving the members along a path transverse to the direction in which the fibers are held, means for shifting the fiber lengthwise, between said gripping members, after the exposed portion has been dressed, to expose the previously gripped portion, and means for discharging the fiber transversely of the direction of movement of said members after the last-exposed portion thereof has been dressed.

21. In fiber dressing apparatus, the combination of dressing devices, conveying means, means progressed by said conveying means for gripping fiber with a portion positioned to be dressed by said devices, and for then shifting the fiber to a position in which another portion thereof is exposed, and means for thereafter dressing said last named portion.

22. In fiber dressing apparatus, the combination of dressing devices, means for causing relative movement between the same and bunches of fiber transversely to the direction in which the fibers extend to dress the latter, and means for then discharging the fiber in the direction of its length from the apparatus.

23. In fiber dressing apparatus, the combination of gripping members, adapted to hold fiber therebetween and movable along a path, and means for shifting fiber lengthwise between said members first in one direction and later in the opposite direction, transversely to the direction of said path.

24. In fiber dressing apparatus, the combination of a feed wheel, means for rotating it in one direction and positioning fiber thereabout, and means for thereafter rotating it in the opposite direction and withdrawing lengths of fiber therefrom.

25. In fiber dressing apparatus, the combination of a fiber supply member, a series of following gripping members, means for progressing them past said supply member, and means for cutting and withdrawing lengths of fiber from said supply member and inserting them between pairs of said gripping members as the latter pass said supply member.

26. In fiber dressing apparatus, the combination of a plurality of series of following gripping members, each series separated from the next, and the members of each series being one behind the other, means for progressing them through a closed path, and means for inserting fiber transversely between each pair of adjacent gripping members in each series as they pass a fixed point.

27. In fiber dressing apparatus, the combination of a plurality of series of following gripping members, each series separated from the next, means for progressing them through a closed path, a fiber supply member, means for taking fiber therefrom and positioning it between each pair of adjacent gripping members in each series as they pass said supply member, and means for loading said supply member with fiber in the intervals between the passage of the various series of gripping members past the same.

28. In fiber dressing apparatus, the combination of a pair of gripping members, a fiber supply member, and a reciprocating member arranged to move in one direction between said gripping members, engage a bunch of fiber, and move in the opposite direction between said gripping members to insert said bunch therebetween.

29. In fiber dressing apparatus, the combination of a pair of gripping members, a fiber supply member, and a reciprocating member arranged to move in one direction between said gripping members, cut through fiber in said supply member, and on its return movement engage and draw with it between said gripping members the end of the bunch of fiber at one side of the cut section.

30. In fiber dressing apparatus, the combination of a pair of gripping members, a supply member containing a supply of fiber, and means for cutting across the fiber in said supply member at two points and inserting the length of fiber contained between the two cuts between said gripping members.

In testimony whereof we have signed our names to this specification.

OLIVER LA WHITE.
HENRY LA WHITE.